Jan. 6, 1953

E. L. STEIN 2,624,408

SHEET TRIMMER

Filed Nov. 25, 1947

INVENTOR.
ELMER L. STEIN
BY
Wheeler, Wheeler & Wheeler
ATTORNEYS

Patented Jan. 6, 1953

2,624,408

UNITED STATES PATENT OFFICE 2,624,408

SHEET TRIMMER

Elmer L. Stein, Milwaukee, Wis.

Application November 25, 1947, Serial No. 787,993

4 Claims. (Cl. 164—79)

This invention relates to a sheet trimmer comprising a trimming board and a manually guided sheet-trimming knife operated by its movement along the cutting edge of the board in frictional contact with a work-protective strip.

It is the object of the invention to provide an inexpensive but highly effective sheet trimmer which will make a clean cut, which may be operated with great speed and efficiency and without requiring particular dexterity, and which, by reason of the special constructional features of the trimming knife and board, has an unusually effective shearing action without injury to the most delicate work.

More specifically, it is an object of the present invention to provide a board in which resilience is afforded by the edge of the board rather than by the cutting knife, the knife being rotary and receiving motion while traversing the board, the work being protected by a flexible cover member which provides a path for the driver of the rotary knife. By this combination of parts, I have eliminated the usual oscillatory steel knife and have produced a higher relative rate of motion between the shearing parts to effectuate a cleaner cut without injury to the work.

The foregoing and other objects will be amplified in the following disclosure of the invention.

The board 5 supports the workpiece or sheet to be trimmed at 6 (Fig. 3) in the usual manner and may, as usual, be provided with a ruler at 7 to assist in positioning the workpiece.

Figure 2:
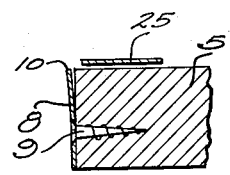
Fig. 2 is a fragmentary detail view of a portion of the board in transverse section.
Figure 3:
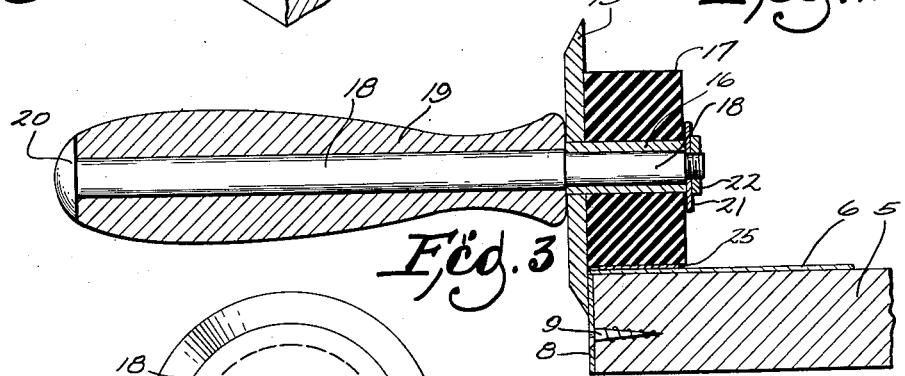
Fig. 3 is a view similar to Fig. 2 but further amplified to show the rotary knife traversing the sectionally illustrated portion of the board.
Figure 4:
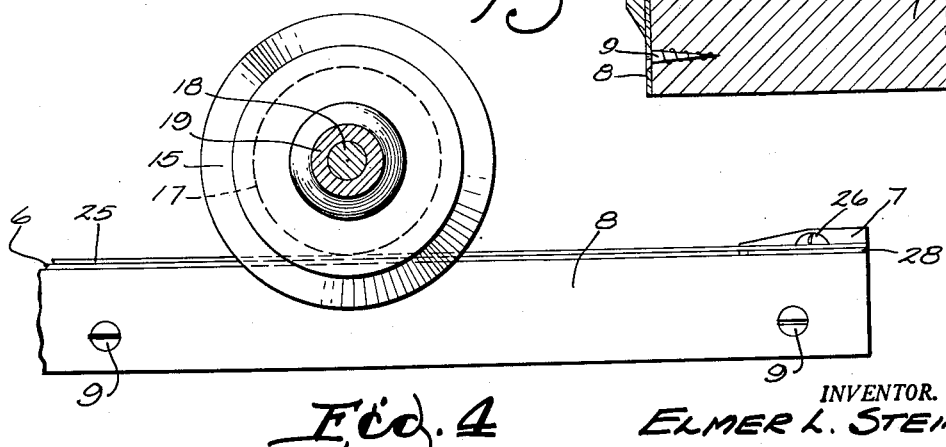
Fig. 4 is a view in side elevation of a portion of the board upon which the knife appears, the handle of the knife being shown in section.

The stationary shearing edge of such a board is conventionally entirely rigid. In the present device, the stationary shearing edge comprises a thin strip or band of resilient spring steel or the like which is shown at 8. Instead of fastening this spring strip rigidly to the bed 5, I locate the screw holes downwardly from the center line. As a result, when the screws 9 are inserted, the upper margin 10 of the shear strip springs slightly away from the board as shown in somewhat exaggerated fashion in Fig. 2, thus providing a resiliently yieldable cutting edge for co-acting with the rotary knife 15. As the knife passes a given point, the manual pressure exerted on the knife for the guidance thereof will ordinarily cause the free cutting edge 10 to spring inwardly into abutment with the bed board 5 as shown in Fig. 3.

The knife 15 is fixed on a bushing 16 which also carries a driver, preferably comprising a tube roller 17. This roller is desirably vulcanized or otherwise fastened to the knife disk 15 so that rotation of the roller in passing over a surface with which it is in frictional contact will drive the knife. The greater radius of the knife will cause the periphery to have a somewhat higher rate of linear speed than the periphery of the driver.

These rotatable parts are mounted upon a shouldered shaft 18 which also provides a rotatable support for the handle 19. The headed end 20 of the shaft engages the end of the handle. The rotatable bushing 16 is engaged by a washer 21 held by a nut 22 threaded to the reduced end of the shaft.

Since the sheet 6 requiring trimming must necessarily extend to the cutting edge 10 of the stationary shear knife 8, it would have a face portion traversed by the driver 17 and might sustain damage either to its surface, or to ink printed thereon, were it not for the fact that I provide the bed plate 5 with a flexible strip 25 firmly anchored at least at one end, as by the screw 26. The work sheet 6 extends beneath the flexible track strip 25 upon which the roller 17 bears in developing such friction as is required to rotate the shear knife 15 in proximity to the shearing edge 10 for the trimming of the work sheet.

Figure 1:
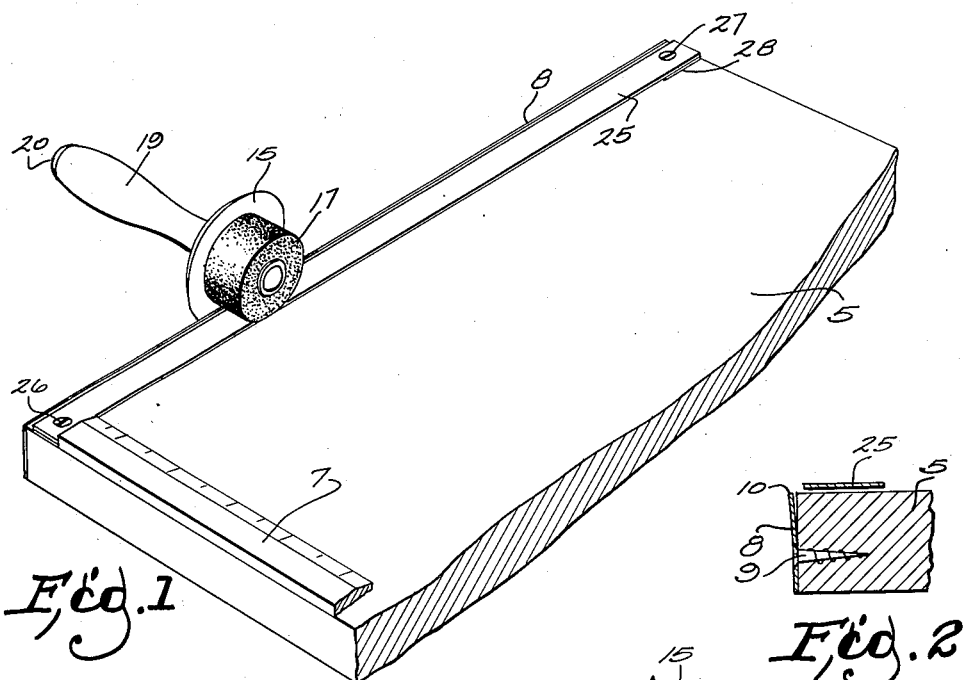
Fig. 1 is a view in perspective showing a sheet trimmer embodying my invention.

Since the manually guided rotary shear is ordinarily moved away from the top of the board, as represented by the ruler 7, the thrust on the track strip 25 is always in such direction of movement, and the track strip needs anchorage only at that end of the board from which the knife moves. It may, however, be provided with additional anchorage at 27, and its two ends may be supported from the board by shims as indicated at 28 in Fig. 1 to receive the work sheet therebeneath. Whether or not the track strip 25 is anchored at 27, its flexibility is such that the downward thrust upon it will be transmitted through the work sheet directly to the board, and this, obviously, does not in any way harm the work sheet or any printing or decoration on the face thereof.

The resiliently yieldable cutting edge at 10 and the provision of a track strip 25 separate from the work piece make it feasible to take practical advantage of the high rate of shearing cut provided by a frictionally driven rotary knife.

Whether or not used with a rotary manually guided knife as herein disclosed, the strip 25 has value as a means of clamping or holding the work sheet 6 during the trimming thereof. In the device as disclosed, the pressure of the roller 17 on the strip 25 supplies the clamping pressure for holding the work sheet, such clamping pressure being progressively effected adjacent the areas progressively acted upon by the trimming knife.

I claim:

1. The combination with a cutting board having a working edge, of a shear knife comprising a blade strip extending longitudinally of said edge and having a free cutting margin spaced slightly outwardly of said edge, said strip being resiliently flexible whereby said margin is yieldable toward the said edge, the edge of the board being in such proximity to the blade strip as to constitute a fixed backing limiting yielding movement of the strip and engaged by the free margin of the strip at the extreme of its yielding movement in each cutting operation.

2. For use with a rotary cutting knife having a thrust bearing mounting whereby to sustain a predetermined minimum of thrust axial of its rotary motion and having a roller like portion, a trimming board having a shear knife extending along one edge, said shear knife having a shearing margin slightly spaced from the edge of the board and resiliently yieldable into contact with said edge of the board in response to rotary knife thrust, and a flexible work-protecting track strip extending along the face of the board in substantial parallelism with said margin and adjacent said edge whereby to receive the roller like portion of the rotary knife.

3. The device of claim 2 in which said strip is connected with the board adjacent its respective ends and is provided with shims supporting said strip above the board to receive a work sheet therebeneath, said strip being flexible to engage such sheet.

4. A trimming board having a face and a cutting edge, spacers disposed on said face adjacent opposite end portions of said cutting edge, a resiliently flexible strip extending along said edge above said face and having its ends mounted on said spacers and provided with means fixedly connecting such ends with the board, the intermediate portion of said strip being resiliently yieldable toward the face of the board into clamping engagement with work which said strip portion is normally spaced above the board to receive, said intermediate strip portion further constituting a runway.

ELMER L. STEIN.

REFERENCES CITED

The following references are of record in the file of this patent:

UNITED STATES PATENTS

| Number | Name | Date |
| --- | --- | --- |
| 318,556 | French | May 26, 1885 |
| 439,954 | Jackson | Nov. 4, 1890 |
| 440,879 | Jackson | Nov. 18, 1890 |
| 683,524 | Tinkham | Oct. 1, 1901 |
| 954,705 | Slaybaugh et al. | Apr. 12, 1910 |
| 992,755 | Crocker | May 23, 1911 |
| 1,099,942 | Scardino | June 16, 1914 |
| 1,173,580 | Jennings | Feb. 29, 1916 |
| 1,490,230 | Pollock | Apr. 15, 1924 |
| 1,645,385 | Kaplan | Oct. 11, 1927 |
| 2,219,485 | Neuwirth | Oct. 29, 1940 |

FOREIGN PATENTS

| Number | Country | Date |
| --- | --- | --- |
| 134,744 | England | Nov. 13, 1919 |
| 340,591 | Germany | Sept. 15, 1921 |
| 500,633 | Great Britain | Feb. 13, 1939 |